(12) United States Patent
Lai et al.

(10) Patent No.: US 8,009,761 B2
(45) Date of Patent: Aug. 30, 2011

(54) UNIFIED MODULATOR FOR CONTINUOUS PHASE MODULATION AND PHASE-SHIFT KEYING

(75) Inventors: Kuei-Chiang Lai, La Jolla, CA (US); Helena D. O'Shea, San Diego, CA (US)

(73) Assignee: Qualcomm Incorporation, San Diego, CA (US)

( * ) Notice: Subject to any disclaimer, the term of this patent is extended or adjusted under 35 U.S.C. 154(b) by 686 days.

(21) Appl. No.: 10/877,140

(22) Filed: Jun. 24, 2004

(65) Prior Publication Data

US 2005/0286653 A1 Dec. 29, 2005

(51) Int. Cl.
 *H04K 1/02* (2006.01)
 *H04L 25/03* (2006.01)
 *H04L 25/49* (2006.01)

(52) U.S. Cl. ........ 375/296; 375/273; 375/274; 375/308; 375/315

(58) Field of Classification Search .......... 375/219–223, 375/259, 261, 271–285, 315, 377, 361, 264, 375/269, 295–298, 302, 308, 309
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 6,400,928 | B1 | 6/2002 | Khullar et al. | |
| 6,421,398 | B1 * | 7/2002 | McVey | 375/308 |
| 6,865,235 | B2 * | 3/2005 | Khoini-Poorfard | 375/272 |
| 7,302,016 | B1 * | 11/2007 | Rice et al. | 375/329 |
| 7,515,652 | B2 * | 4/2009 | Jensen | 375/308 |
| 2002/0168026 | A1 * | 11/2002 | Khoini-Poorfard | 375/303 |
| 2005/0220218 | A1 * | 10/2005 | Jensen et al. | 375/302 |
| 2005/0220219 | A1 * | 10/2005 | Jensen | 375/302 |
| 2005/0249312 | A1 * | 11/2005 | Bode et al. | 375/308 |

(Continued)

FOREIGN PATENT DOCUMENTS

WO  WO 2004/021659  3/2004

OTHER PUBLICATIONS

*Laurent's Representation of Binary Digital Continuous Phase Modulated Signals with Modulation Index ½ Revisited*; Peter Jung, Member, IEEE; IEEE Transactions on Communications, vol. 42, No. 2/3/4, Feb./Mar./Apr. 1994; pp. 221-224.

(Continued)

*Primary Examiner* — Dac Ha
*Assistant Examiner* — James M Perez
(74) *Attorney, Agent, or Firm* — Howard H. Seo; Sayed H. Beladi

(57) ABSTRACT

A "unified" modulator for multiple modulation schemes (e.g., GMSK and 8PSK) is described. The waveform for each modulation scheme is generated based on a set of one or more pulse shaping functions. The waveforms for all supported modulation schemes may be generated based on a composite set of all the different pulse shaping functions. The unified modulator includes a filter for each pulse shaping function in the composite set. To generate the waveform for a selected modulation scheme, the set of one or more filters for this modulation scheme is enabled and all other filters are disabled. The outputs from all enabled filters are summed to generate a modulator output. When switching between modulation schemes, a smooth transition may be obtained by (1) providing a suitable data pattern for each filter to be enabled or disabled and (2) generating symbols for the new modulation scheme with an appropriate initial phase.

35 Claims, 9 Drawing Sheets

U.S. PATENT DOCUMENTS

2008/0253349 A1* 10/2008 Yu .................................. 370/345

OTHER PUBLICATIONS

*Exact and Approximate Construction of Digital Phase Modulations by Superposition of Amplitude Modulated Pulses (AMP)*; Pierre A Laurent, IEEE Transactions on Communications, vol. Com-34, No. 2 Feb. 1986.

Bode, et al.; *Combined GMSK and 8PSK Modulator for GSM and EDGE*; Proceedings of the 2003 IEEE International Symposium on Circuits and Systems; vol. 3 of 5, May 25, 2003, pp. III-614.

International Search Report—PCT/US2005/022039, International Search Authority—European Patent Office—Oct. 24, 2005.
Written Opinion—PCT/US2005/022039, International Search Authority—European Patent Office—Oct. 24, 2005.
International Preliminary Report on Patentability—PCT/US2005/022039, International Search Authority—IPEA/US—Alexandria, Virginia—Oct. 22, 2007.

* cited by examiner

UNIFIED MODULATOR FOR CONTINUOUS PHASE MODULATION AND PHASE-SHIFT KEYING

BACKGROUND

I. Field

The present invention relates generally to communication, and more specifically to a modulator for a transmitter in a wireless communication system.

II. Background

In a wireless communication system, a transmitter first digitally processes traffic/packet data to obtain coded data. The transmitter then modulates a carrier signal with the coded data to obtain a modulated signal that is more suitable for transmission via a wireless channel. The modulation may be performed based on various modulation schemes such as, for example, continuous phase modulation (CPM) and phase-shift keying (PSK).

With CPM, the phase of the carrier signal is modulated by the coded data in a continuous rather than abrupt manner. As a result, a CPM modulated signal (or simply, a CPM signal) has several desirable characteristics including a constant envelope and a compact spectrum. The constant envelope allows the CPM signal to be transmitted using an efficient power amplifier. The compact spectrum enables efficient utilization of the available frequency spectrum. However, the CPM signal also has a fairly complex waveform that can complicate the transmitter and receiver designs.

With PSK, the phase of the carrier signal is modulated by the coded data in an abrupt manner at each symbol period. Furthermore, the phase of the carrier signal is restricted to be at specific points in a signal constellation. Some commonly used PSK schemes include binary-PSK (BPSK), quadrature-PSK (QPSK), and 8-ary PSK (8PSK). PSK is also widely used because of the ease in which a PSK modulated signal (or simply, a PSK signal) may be generated at a transmitter and processed at a receiver.

A transmitter may be required to support multiple modulation schemes. For example, a transmitter may need to support Gaussian minimum shift keying (GMSK) for Global System for Mobile Communication (GSM) and 8PSK for Enhanced General Packet Radio Service (EGPRS). GSM is a wireless communication system that is widely deployed throughout the world. EGPRS is a packet data service for GSM and employs 8PSK to achieve a higher data rate. GMSK is one class of CPM, and a GMSK waveform has the complexity normally associated with a CPM waveform. Since GSM and EGPRS are widely deployed, it is highly desirable to have an efficient modulator that can support both GMSK and 8PSK.

SUMMARY

A "unified" modulator capable of supporting multiple modulation schemes (e.g., GMSK and 8PSK) is described herein. The waveform for each modulation scheme may be generated based on a set of one or more pulse shaping functions, as described below. The waveforms for all supported modulation schemes may be generated based on a composite set of all the different pulse shaping functions used for these modulation schemes. The unified modulator includes a filter for each pulse shaping function in the composite set. To generate the waveform for a selected modulation scheme, a set of one or more filters for the set of one or more pulse shaping functions used for the selected modulation scheme is enabled, and all other filters are disabled. The outputs from all enabled filters are summed to generate a modulator output, which may be used (e.g., to phase modulate a carrier signal) to generate a modulated signal.

To ensure a smooth transition when switching from one (current) modulation scheme to another (new) modulation scheme, a suitable data pattern may be provided during a transitioning period to each filter that is to be enabled or disabled. The data pattern for each filter may be selected to (1) reduce the amount of variation in the envelope of the modulator output, (2) initialize the filter to a proper initial state, if the filter is being enabled or turned on for the new modulation scheme, and (3) reset the filter to a proper final state, if the filter is being disabled or turned off. Each filter to be turned on or off for the new modulation scheme may thus be used as an interpolation filter to achieve a smooth transition from the waveform for the current modulation scheme to the waveform for the new modulation scheme. The symbols for the new modulation scheme may also be generated with a suitable phase offset (or initial phase) to ensure phase continuity in the modulator output.

An exemplary unified modulator for GMSK and 8PSK is described below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The unified modulator described herein may be used for various CPM and PSK signals and for various wireless communication systems. For clarity, a specific unified modulator that can support GMSK and 8PSK for GSM and EGPRS, respectively, is described below.

Figure 1:
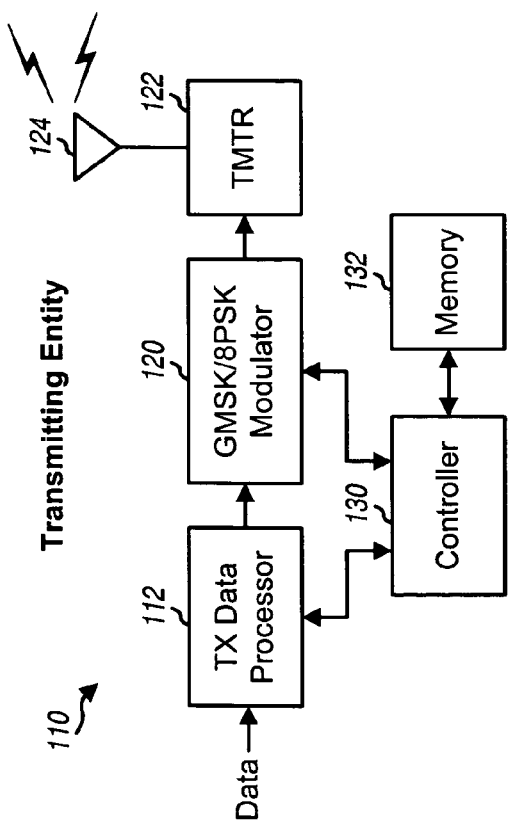
FIG. 1 shows a block diagram of a transmitting entity.

FIG. 1 shows a block diagram of a transmitting entity 110, which may be a base station or a wireless device in a GSM system. At transmitting entity 110, a transmit (TX) data processor 112 receives, formats, codes, and interleaves data based on one or more coding and interleaving schemes and provides a stream of input bits for a unified GMSK/8PSK modulator 120. Modulator 120 performs GMSK or 8PSK modulation on the input bits, as described below, and provides a modulator output signal. A transmitter unit (TMTR) 122 further processes the modulator output signal to generate a radio frequency (RF) modulated signal that is transmitted via an antenna 124. A controller 130 directs operation at transmitting entity 110. A memory unit 132 provides storage for program codes and data used by controller 130.

Figure 2:
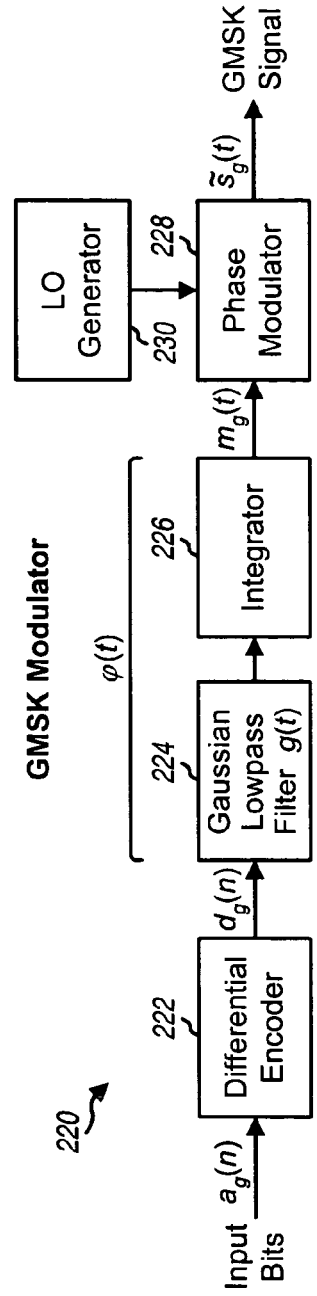
FIG. 2 shows a block diagram of a GMSK modulator.

FIG. 2 shows a block diagram of a GMSK modulator 220, which can generate a GMSK modulated signal (or simply, a GMSK signal) for GSM. Within GMSK modulator 220, a differential encoder 222 receives and performs differential encoding on the input bits $\{a_g(n)\}$ and provides code symbols $\{d_g(n)\}$, where n is an index for symbol period. Each code symbol $d_g(n)$ corresponds to one input bit $a_g(n)$ and is generated based on that input bit $a_g(n)$ and a preceding input bit $a_g(n-1)$. The symbol rate for $\{d_g(n)\}$ is thus equal to the bit rate for $\{a_g(n)\}$. For simplicity, each input bit $a_g(n)$ and each code symbol $d_g(n)$ is assumed to be a bipolar value of either +1 or −1, i.e., $a_g(n) \in \{-1, +1\}$ and $d_g(n) \in \{-1, +1\}$. A Gaussian lowpass filter 224 receives and filters the code symbols $\{d_g(n)\}$. For GSM, filter 224 has a BT product of 0.3, where B denotes the −3 dB bandwidth of the filter and T denotes one symbol period. For BT=0.3, filter 224 provides a frequency pulse g(t) having a duration of approximately four symbol periods for each code symbol $d_g(n)$, where t is a variable for continuous time. Each code symbol $d_g(n)$ is thus sent over four symbol periods.

An integrator 226 integrates the output of filter 224 and provides a modulating signal $m_g(t)$, which contains a phase pulse $\phi(t)$ for each frequency pulse g(t) and thus for each code symbol $d_g(n)$. Because of the filtering and integration as defined by GSM, the modulating signal $m_g(t)$ transitions by at most 90° or π/2 in each symbol period. The direction of the phase transition is either clockwise or counter-clockwise on a signal constellation and is determined by the values of the code symbols. A phase modulator 228 receives the modulating signal $m_g(t)$ from integrator 226 and a carrier signal from a local oscillator (LO) generator 230, modulates the carrier signal with the modulating signal, and provides a GMSK signal, $\tilde{s}_g(t)$.

The GMSK signal may be expressed in continuous time t as follows:

$$\tilde{s}_g(t) = \exp\left(j\left[\theta_0 + \sum_{n=-\infty}^{\infty} d_g(n) \cdot \varphi(t - nT)\right]\right), \text{ for } nT < t < (n+1)T, \quad \text{Eq (1)}$$

where
 $\phi(t)$ is the phase pulse/function determined by filter 224 and integrator 226;
 $\theta_0$ is an arbitrary phase value; and
 $\exp(jx) = \cos(x) + j\sin(x)$.
For simplicity, equation (1) shows a baseband representation for the GMSK signal, so that the "ωt" term for the angular frequency of the carrier signal is omitted from equation (1). Equation (1) indicates that the code symbols $\{d_g(n)\}$ are embedded in the phase of the GMSK signal. Equation (1) also indicates that the phase of the GMSK signal is obtained by multiplying each code symbol $d_g(n)$ with a delayed version of the phase pulse $\phi(t-nT)$ and summing the scaled and delayed phase pulses for all code symbols. For simplicity, the parentheses "{ }" for $\{a_g(n)\}$ and $\{d_g f(n)\}$ are omitted in the following description.

The phase-modulated GMSK signal shown in equation (1) may be represented as a superposition/sum of eight amplitude-modulated signals in discrete time n, as follows:

$$\tilde{s}_g(t) = c_0(n) \otimes d_0(n) + \ldots + c_7(n) \otimes d_7(n) = \sum_{i=0}^{7} c_i(n) \otimes d_i(n), \quad \text{Eq (2)}$$

where
 $\otimes$ denotes a convolution operation;
 $c_i(n)$ denotes the i-th pulse shaping function; and
 $d_i(n)$ denotes the input symbols for the i-th pulse shaping function $c_i(n)$.
Equation (2) indicates that a complex, sampled GMSK signal $\tilde{s}_g(n)$ may be expressed as a sum of amplitude-modulated signals. Each amplitude-modulated signal is generated by convolving a pulse shaping function $c_i(n)$ with its corresponding input symbols $d_i(n)$. The input symbols $d_i(n)$ may be derived based on the input bits $a_g(n)$, as described below.

Figure 3:
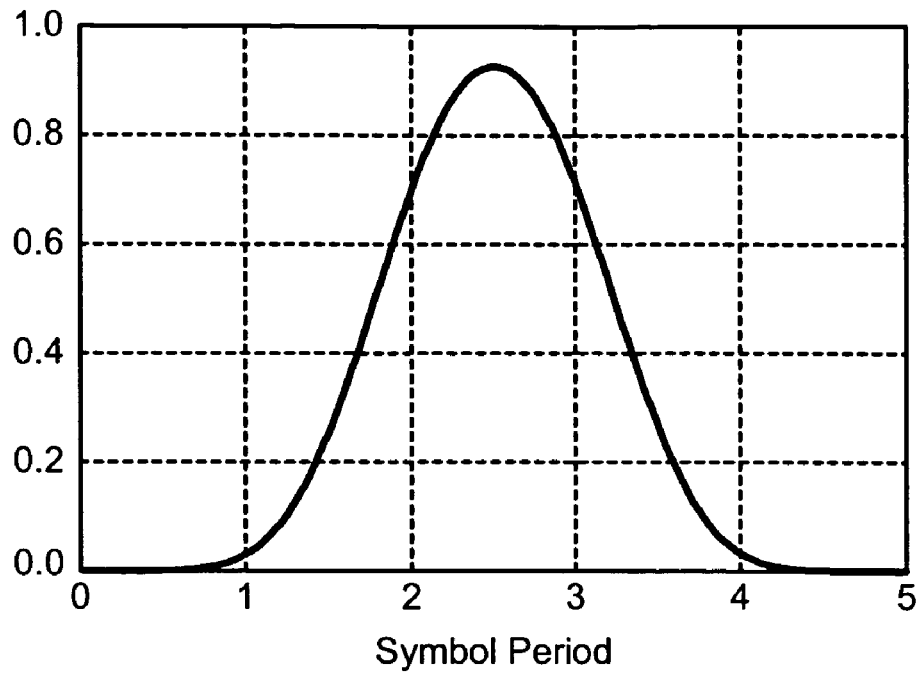
FIG. 3 shows plots of the two largest pulse shaping functions for GMSK.
Figure 3:
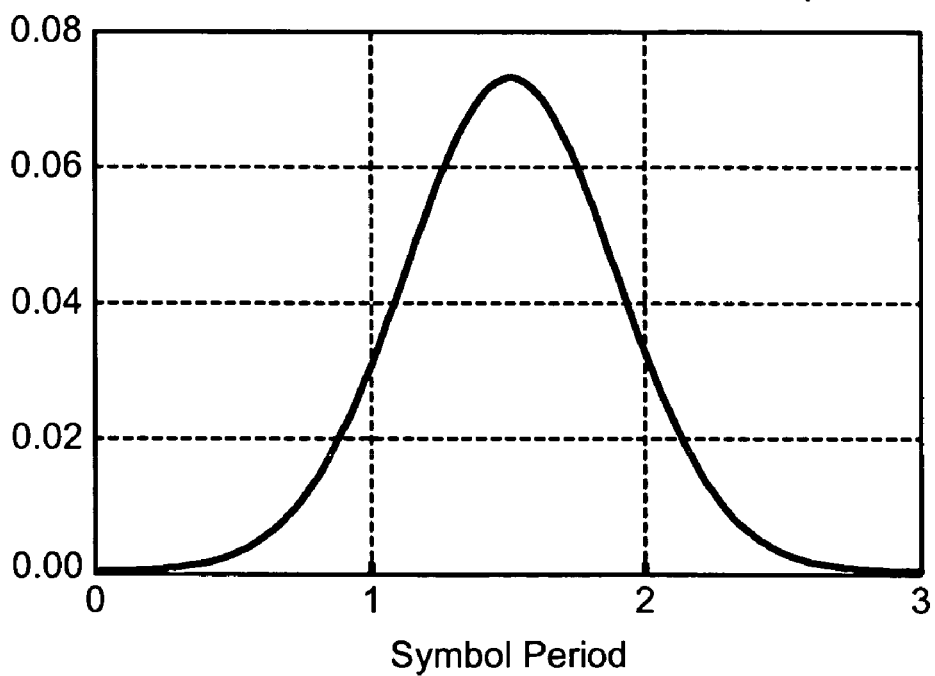

FIG. 3 shows plots of the two largest pulse shaping functions for GMSK. The eight pulse shaping functions for GMSK are denoted as $c_i(n)$ for i=0, 1, ... 7. Of these eight pulse shaping functions, $c_0(n)$ is the largest or "dominant" pulse shaping function and is more than ten times larger than the other seven pulse shaping functions. The second largest or "secondary" pulse shaping function is $c_1(n)$, which is more than 40 times larger than the remaining six pulse shaping functions. The dominant pulse shaping function $c_0(n)$ spans five symbol periods, and the secondary pulse shaping function $c_1(n)$ spans three symbol periods, as shown in FIG. 3.

The decomposition of a CPM signal to amplitude-modulated pulse (AMP) representation, the pulse shaping functions, and the generation of the input symbols for these pulse shaping functions are described by P. A. Laurent in a paper entitled "Exact and Approximate Construction of Digital Phase Modulations by Superposition of Amplitude Modulated Pulses (AMP)," IEEE Transactions on Communications, Vol. COM-34, No. 2, February 1986.

To simplify the transmitter design, the GMSK signal may be approximated using just the dominant pulse shaping function $c_0(n)$, as follows:

$$\hat{s}_g(n) = c_0(n) \hat{\times} d_0(n). \quad \text{Eq (3)}$$

Since the dominant pulse shaping function $c_0(n)$ is much larger than the other seven pulse shaping functions, the approximated GMSK signal $\hat{s}_g(n)$ is a reasonably good estimate of the ideal GMSK signal $\tilde{s}_g(n)$. However, the use of just $c_0(n)$ to generate $\hat{s}_g(n)$ may provide insufficient margins for various GSM specifications such as, for example, (1) root mean square (RMS) phase error between $\hat{s}_g(n)$ and $\tilde{s}_g(n)$, and (2) variation in the envelope of $\hat{s}_g(n)$.

A better approximation of the GMSK signal may be obtained by using the two largest pulse shaping functions $c_0(n)$ and $c_1(n)$, as follows:

$$s_g(n) = c_0(n) \otimes d_0(n) + c_1(n) \otimes d_1(n). \quad \text{Eq (4)}$$

The estimated GMSK signal $s_g(n)$ is a better approximation of the ideal GMSK signal $\tilde{s}_g(n)$ and can meet the various GSM specifications with good margins.

Figure 4:
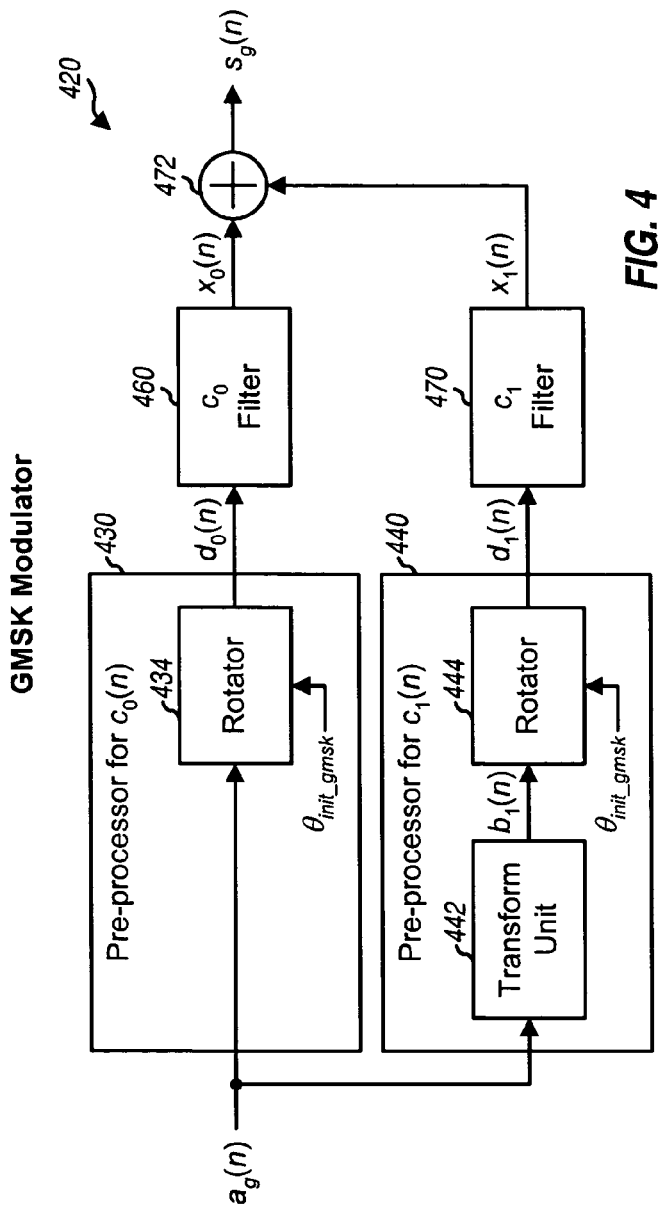
FIG. 4 shows a block diagram of a GMSK modulator based on the two largest pulse shaping functions.

FIG. 4 shows a block diagram of a GMSK modulator 420, which can generate the estimated GMSK signal $s_g(n)$ in equation (4). Within GMSK modulator 420, a pre-processor 430 receives the input bits $a_g(n)$ and generates GMSK symbols $d_0(n)$, which are the input symbols for the dominant pulse shaping function $c_0(n)$. A filter 460 receives and filters the GMSK symbols $d_0(n)$ and provides filter output symbols $x_0(n)$. Filter 460 has an impulse response that is equal to the dominant pulse shaping function $c_0(n)$. Filter 470 is thus also called the "$c_0$" filter.

A pre-processor 440 receives the input bits $a_g(n)$ and generates GMSK symbols $d_1(n)$, which are the input symbols for the secondary pulse shaping function $c_1(n)$. A filter 470 receives and filters the GMSK symbols $d_1(n)$ and provides filter output symbols $x_1(n)$. Filter 470 has an impulse response that is equal to the secondary pulse shaping function $c_1(n)$. Filter 470 is thus also called the "$c_1$" filter. A summer 472 receives and sums the filter output symbols $x_0(n)$ and $x_1(n)$ and provides the estimated GMSK signal $s_g(n)$.

For GMSK, differential encoding is first performed on the input bits $a_g(n)$ to obtain the code symbols $d_g(n)$, as shown in FIG. 2. The input symbols $d_i(n)$ for each pulse shaping function $c_i(n)$ may be derived from the code symbols $d_g(n)$ based on a known transformation associated with that function, as described by Laurent. There is a one-to-one mapping between $d_g(n)$ and $d_i(n)$ for each pulse shaping function $c_i(n)$. The input symbols $d_i(n)$ may also be derived directly from the input bits $a_g(n)$ by taking into account (1) the different encoding on $a_g(n)$ to obtain $d_g(n)$ and (2) the transformation from $d_g(n)$ to $d_i(n)$.

The GMSK symbols $d_0(n)$ for the $c_0$ filter may be generated as follows:

$$d_0(n) = j^{(n+\theta_{init\_gmsk})} \cdot a_g(n), \qquad \text{Eq (5)}$$

where $j=\sqrt{-1}$ and $\theta_{init\_gmsk}$ is an initial phase value for the estimated GMSK signal. The initial phase $\theta_{init\_gmsk}$ may change from GMSK burst to GMSK burst. Equation (5) indicates that the GMSK symbols $d_0(n)$ may be obtained by rotating the input bits $a_g(n)$ by successively larger phase amounts $j^n$, starting with $$j^{\theta_{init\_gmsk}+1}$$

for the first input bit $a_g(1)$. The phase rotation for any given input bit is 0, $\pi/2$, $\pi$, or $3\pi/2$ since phase wraps around every $2\pi$.

Within pre-processor 430, a rotator 434 rotates each successive input bit $a_g(n)$ by +90°. If $\theta_{init\_gmsk}=0°$, then rotator 434 rotates the first input bit $a_g(1)$ by +90° to obtain GMSK symbol $d_0(1)$, the second input bit $a_g(2)$ by +180° to obtain GMSK symbol $d_0(2)$, the third input bit $a_g(3)$ by +270° to obtain GMSK symbol $d_0(3)$, the fourth input bit $a_g(4)$ by 0° to obtain GMSK symbol $d_0(4)$, and so on.

The GMSK symbols $d_1(n)$ for the $c_1$ filter may be generated as follows:

$$d_1(n) = j^{(n+\theta_{init\_gmsk}-1)} \cdot b_1(n), \text{ and} \qquad \text{Eq (6)}$$

$$b_1(n) = a_g(n) \oplus a_g(n-1) \oplus a_g(n-2), \qquad \text{Eq (7)}$$

where
$b_1(n)$ is a transformed symbol for the secondary pulse shaping function $c_1(n)$; and
$\oplus$ is an exclusive-OR operation (or equivalently, a modulo-2 addition).

The exclusive-OR of two bipolar values y and z may be expressed as:

$$y \oplus z = \begin{cases} +1 & \text{if } y = z \\ -1 & \text{if } y \neq z. \end{cases} \qquad \text{Eq (8)}$$

Within pre-processor 440, a transform unit 442 receives the input bits $a_g(n)$ and generates the transformed symbols $b_1(n)$, as shown in equation (7). A rotator 444 then rotates each successive transformed symbol $b_1(n)$ by +90°. If $\theta_{init\_gmsk}=0°$, then rotator 444 rotates the first transformed symbol $b_1(1)$ by 0° to obtain GMSK symbol $d_1(1)$, the second transformed symbol $b_1(2)$ by +90° to obtain GMSK symbol $d_1(2)$, the third transformed symbol $b_1(3)$ by +180° to obtain GMSK symbol $d_1(3)$, and so on. From equations (5) and (6), the rotation of $a_g(n)$ to obtain $d_0(n)$ is +90° ahead of the rotation of $b_1(n)$ to obtain $d_1(n)$.

Figure 5:
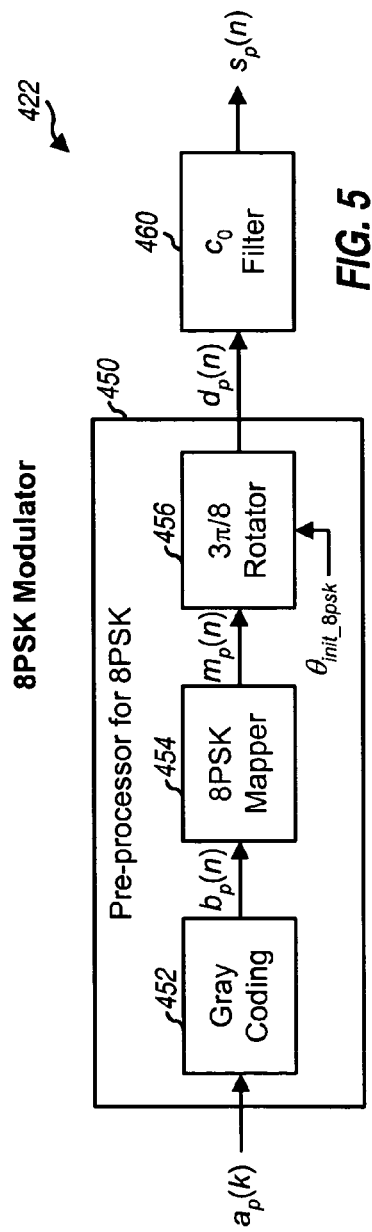
FIG. 5 shows a block diagram of an 8PSK modulator.

FIG. 5 shows a block diagram of an 8PSK modulator 422, which can generate an 8PSK signal $s_p(n)$. Within 8PSK modulator 422, a pre-processor 450 receives 8PSK input bits $a_p(k)$ and generates 8PSK symbols $d_p(n)$, where k is an index for bit period for 8PSK. Within pre-processor 450, a Gray coding unit 452 receives the input bits $a_p(k)$, performs Gray coding on each set of three input bits, and provides a corresponding Gray coded symbol $b_p(n)$, which may have a value ranging from 0 through 7, or $b_p(n) \in \{0, 1, \ldots, 7\}$. The symbol rate for $b_p(n)$ is thus equal to one-third of the bit rate for $a_p(k)$. An 8PSK mapping unit 454 receives the Gray coded symbols and maps each Gray coded symbol $b_p(n)$ to a corresponding modulation symbol $m_p(n)$, as follows:

$$m_p(n) = e^{j2\pi \cdot b_p(n)/8} \qquad \text{Eq (9)}$$

Each modulation symbol $m_p(n)$ is a complex value for a point in a signal constellation used for 8PSK.

EGPRS uses a "rotated" or "offset" 8PSK scheme, which is simply called 8PSK herein. A rotator 456 rotates each successive modulation symbol $m_p(n)$ by $3\pi/8$ to obtain the 8PSK symbol $d_p(n)$, as follows:

$$d_p(n) = m_p(n) \cdot e^{j(n+\theta_{init\_8\,psk})\frac{3\pi}{8}}, \qquad \text{Eq (10)}$$

where $\theta_{init\_8\,psk}$ is an initial phase value for an 8PSK signal and may change from 8PSK burst to 8PSK burst. The rotation by $3\pi/8$ for each 8PSK symbol results in a smaller variation in the envelope of the 8PSK signal, which is desirable for the power amplifier used for the 8PSK signal.

A pulse shaping filter receives and filters the 8PSK symbols $d_p(n)$ from pre-processor 450 to spectrally shape the 8PSK signal. Since GSM specifies the dominant pulse shaping function $c_0(n)$ as the pulse shaping filter for 8PSK, filter 460 for GMSK modulator 420 may also be used as the pulse shaping filter for 8PSK. Filter 460 receives and filters the 8PSK symbols $d_p(n)$ and provides the 8PSK signal $s_p(n)$.

Figure 6:
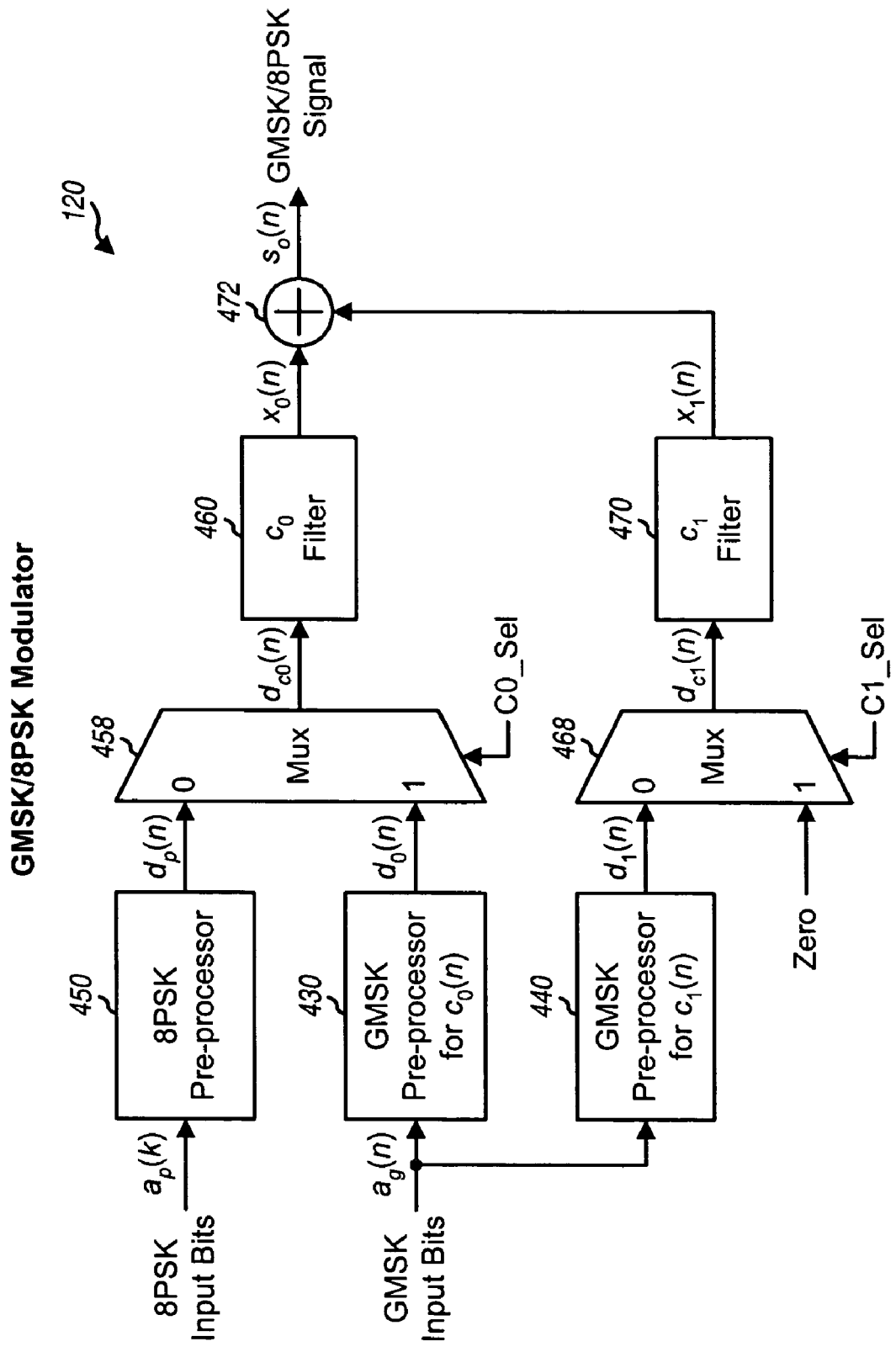
FIG. 6 shows a block diagram of a unified GMSK/8PSK modulator.

FIG. 6 shows a block diagram of an embodiment of unified GMSK/8PSK modulator 120, which implements both GMSK modulator 420 in FIG. 4 and 8PSK modulator 422 in FIG. 5 in an efficient manner. Within modulator 120, pre-processor 450 receives the 8PSK input bits $a_p(k)$, performs processing for 8PSK as described above for FIG. 5, and provides 8PSK symbols $d_p(n)$ to a '0' input of a multiplexer (Mux) 458. Pre-processor 430 receives the GMSK input bits $a_g(n)$, performs processing for the dominant pulse shaping function $c_0(n)$ as described above for FIG. 4, and provides GMSK symbols $d_0(n)$ to a '1' input of multiplexer 458. Multiplexer 458 also receives a C0_Sel control signal and provides either the 8PSK symbols $d_p(n)$ or the GMSK symbols $d_0(n)$ as the filter input symbols $d_{c0}(n)$ for $c_0$ filter 460. Filter 460 then filters the input symbols $d_{c0}(n)$ with the dominant pulse shaping function $c_0(n)$ and provides the filter output symbols $x_0(n)$.

Pre-processor 440 also receives the GMSK input bits $a_g(n)$, performs processing for the secondary pulse shaping function $c_1(n)$ as described above for FIG. 4, and provides GMSK symbols $d_1(n)$ to a '0' input of a multiplexer 468. Multiplexer 468 also receives a zero value on a '1' input and a C1_Sel control signal and provides either the GMSK symbols $d_1(n)$ or the zero value as the filter input symbols $d_{c1}(n)$ for $c_1$ filter 470. Filter 470 then filters the input symbols $d_{c1}(n)$ with the secondary pulse shaping function $c_1(n)$ and provides the filter output symbols $x_1(n)$. Summer 472 sums the filter output symbols $x_0(n)$ and $x_1(n)$ and provides a modulator output signal $s_0(n)$, which may be either a GMSK signal $s_g(n)$ or an 8PSK signal $s_p(n)$ depending on the C0_Sel and C1_Sel control signals. The modulator output signal $s_0(n)$ may be used to phase modulate a carrier signal to generate the RF modulated signal (not shown in FIG. 6).

Figure 7:
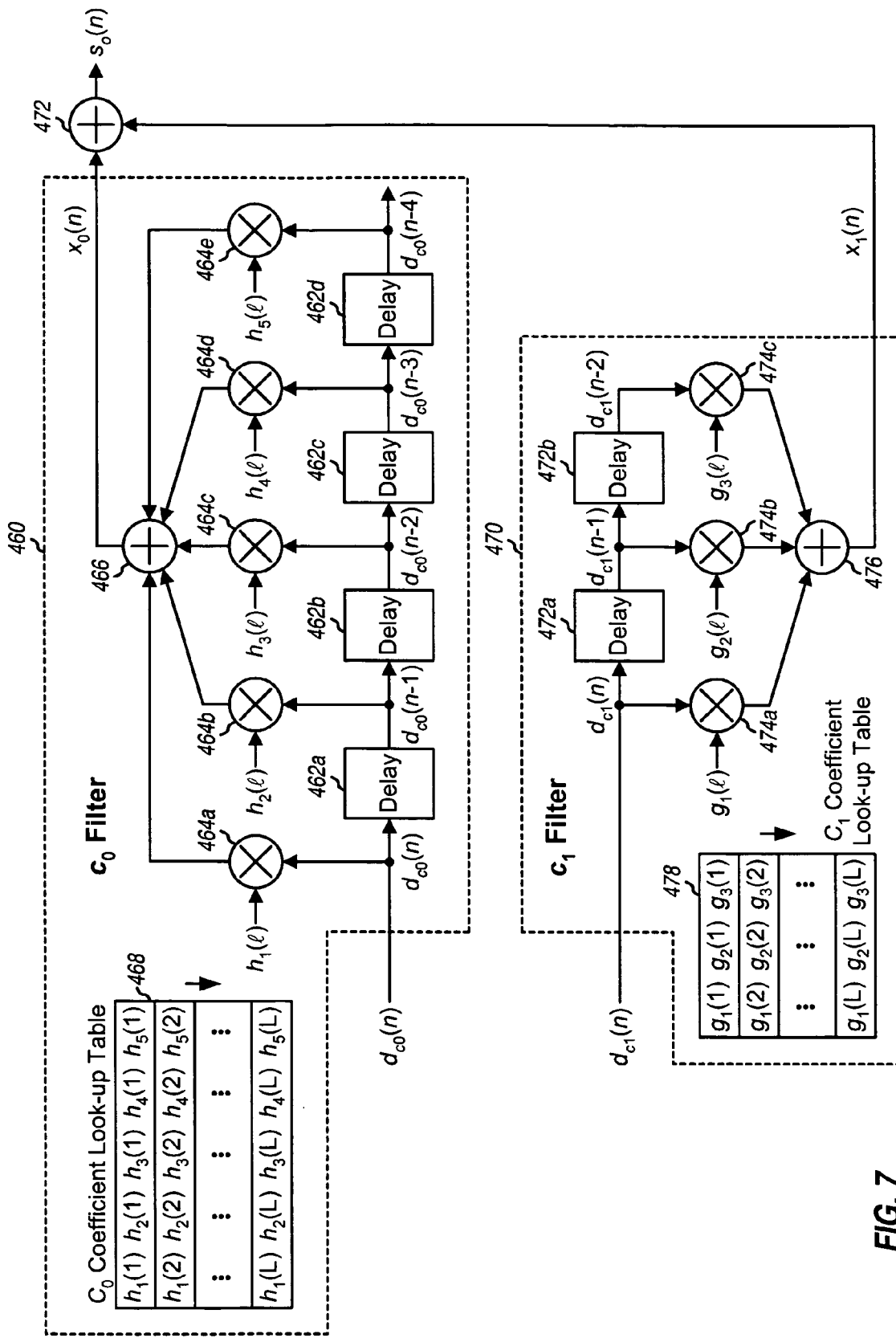
FIG. 7 shows a block diagram of two filters for the two largest pulse shaping functions.

FIG. 7 shows an embodiment of $c_0$ filter 460 and $c_1$ filter 470 using polyphase finite impulse response (FIR) filters. Since the dominant pulse shaping function $c_0(n)$ spans five symbol periods, the $c_0$ filter may be implemented with a 5-tap FIR filter. Within the $c_0$ filter, the filter input symbols $d_{c0}(n)$ are provided to the first of four series-coupled delay elements 462a through 462d. Each delay element 462 delays its input symbol by one symbol period. Delay elements 462a through 462d provide delayed symbols $d_{c0}(n-1)$ through $d_{c0}(n-4)$, respectively. Four multipliers 464a through 464d couple to the input of delay elements 462a through 462d, respectively. A fifth multiplier 464e couples to the output of delay element 462d. Multipliers 464a through 464e receive and multiply input symbols $d_{c0}(n)$ through $d_{c0}(n-4)$ with coefficients $h_1(l)$ through $h_5(l)$, respectively, where l is an index for time offset within a symbol period. A summer 466 receives and sums the outputs of multipliers 464a through 464e and provides the filter output symbols $x_0(n)$.

Since the secondary pulse shaping function $c_1(n)$ spans three symbol periods, the $c_1$ filter may be implemented with a 3-tap FIR filter. Within the $c_1$ filter, the filter input symbols $d_{c1}(n)$ are provided to the first of two series coupled delay elements 472a and 472b. Each delay element 472 delays its input symbol by one symbol period. Delay elements 472a and 472b provide delayed symbols $d_{c1}(n-1)$ and $d_{c1}(n-2)$, respectively. Two multipliers 474a and 474b couple to the input of delay elements 472a and 472b, respectively. A third multiplier 474c couples to the output of delay element 472b. Multipliers 474a through 474c receive and multiply input symbols $d_{c1}(n)$ through $d_{c1}(n-2)$ with coefficients $g_1(l)$ through $g_3(l)$, respectively. A summer 476 receives and sums the outputs of multipliers 474a through 474c and provides the filter output symbols $x_1(n)$.

To obtain high resolution, the pulse shaping functions $c_0(n)$ and $c_1(n)$ may each be sampled by an oversampling ratio (OSR) of L, where L>1 (e.g., L=48). For an OSR of L, each symbol period is partitioned into L equally spaced time offsets that are given indices of l=0 . . . L−1, where l=0 is the first time offset and l=L−1 is the last time offset. The dominant pulse shaping function $c_0(n)$ is oversampled by a factor of L to obtain 5×L coefficients since $c_0(n)$ spans five symbol periods. The 5×L coefficients are for 5×L taps of the $c_0$ filter and may be arranged into L sets, one set for each of the L time offsets. Set l would contain five coefficients for time offset l in the five symbol periods. The L sets of coefficients may be stored, for example, in L rows of a look-up table (LUT) 468. For each symbol period n, the L sets of coefficients in look-up table 468 may be cycled through, starting with the set for l=0, and multiplied with the filter input symbols $d_{c0}(n)$ through $d_{c0}(n-4)$. The multiplier results for each time offset l are accumulated to obtain the filter output symbol $x_0(n)$ for that time offset of symbol period n.

For an OSR of L, there are effectively 3L taps for the $c_1$ filter since $c_1(n)$ spans three symbol periods. The oversampling of $c_1(n)$ yields 3×L coefficients for the 3×L taps. The 3×L coefficients may be arranged in L sets, with set l containing three coefficients for time offset l in the three symbol periods. The L sets of coefficients may be stored, for example, in L rows of a look-up table 478. For each symbol period n, the L sets of coefficients in look-up table 478 may be cycled through, starting with the set for l=0, and multiplied with the filter input symbols $d_{c1}(n)$ through $d_{c1}(n-2)$. The multiplier results for each time offset l are accumulated to obtain the filter output symbols $x_1(n)$ for that time offset of symbol period n.

Figure 10:
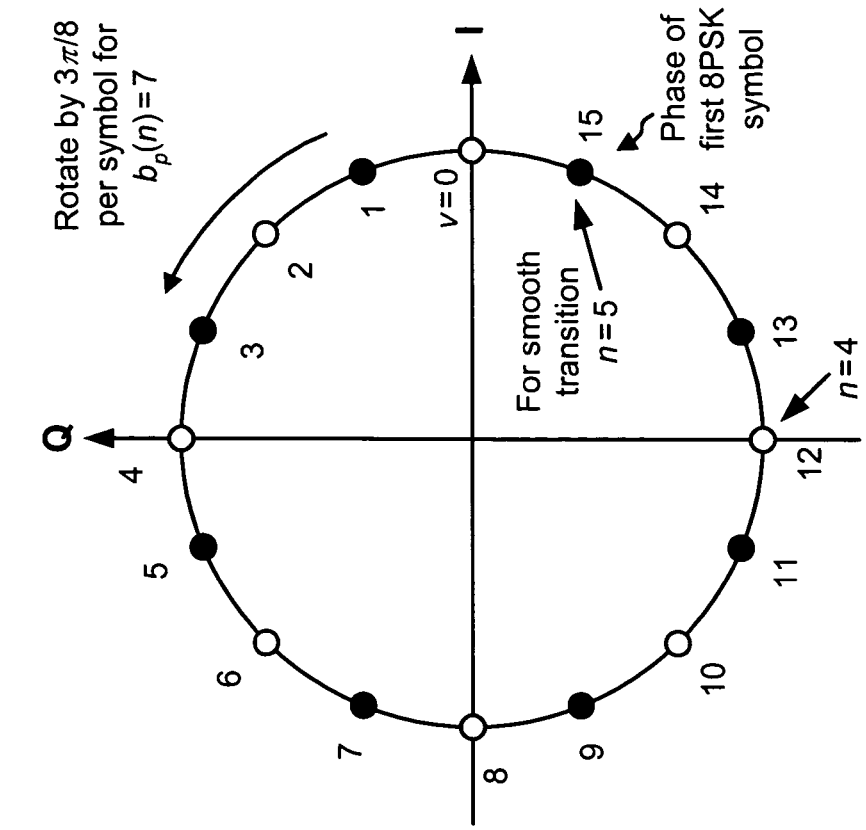
FIG. 10 shows phases of the GMSK and 8PSK symbols for the transition from GMSK to 8PSK.
Figure 10:
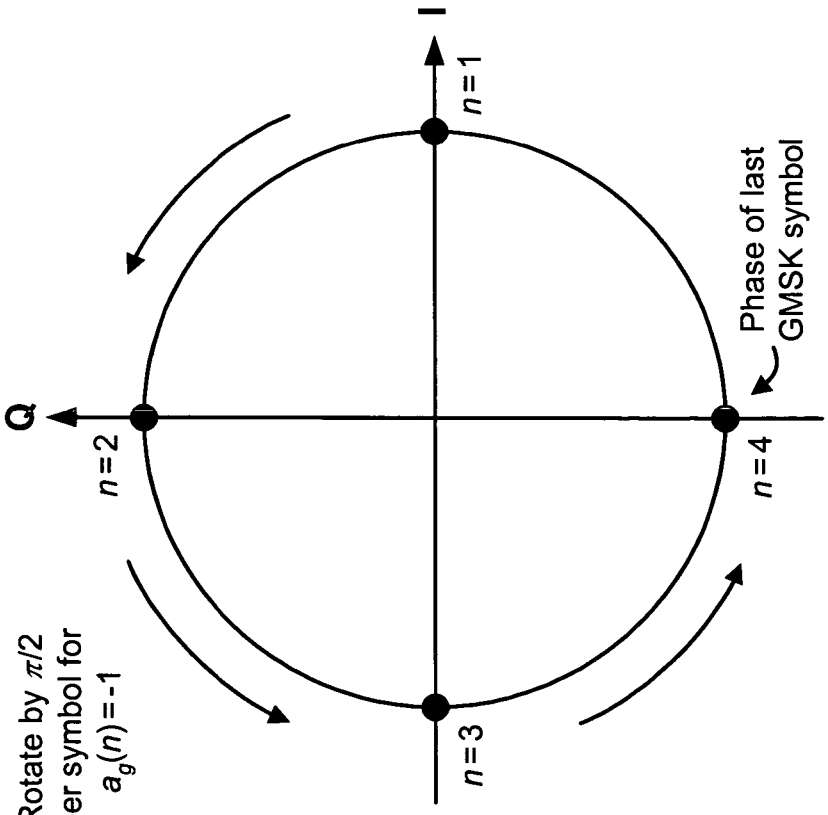

The $c_0$ and $c_1$ filters may be designed to take advantage of known characteristics of the GMSK and 8PSK symbols and the pulse shaping functions. The GMSK symbols can take on four possible complex values of +1, +j, −1, and −j because the GMSK input bits are bipolar and because of the rotation by $j^n$. The 8PSK symbols can take on 16 possible complex values for 16 points equally spaced on a unit circle, as shown in FIG. 10, because of the rotation by $3\pi/8$ per symbol period. The multipliers for the $c_0$ and $c_1$ filters may be simplified because of the limited number of possible values for the GMSK and 8PSK symbols. The multipliers may also be implemented with pre-computed look-up tables. For example, each multiplier may be implemented with a look-up table that receives a filter input symbol and provides a multiplier output. As another example, a set of more than one multiplier may be implemented with a single look-up table that receives a set of filter input symbols and provides a combined output for that set of multipliers.

The pulse shaping functions $c_0(n)$ and $c_1(n)$ exhibit even symmetry, which means that the response for the right half of each pulse shaping function is the mirror image of the response for the left half of the pulse shaping function. As a result, the $c_0$ and $c_1$ filters may be simplified since only half of the coefficients need to be stored.

FIG. 7 shows a specific embodiment of the $c_0$ and $c_1$ filters using FIR filters. The $c_0$ and $c_1$ filters may also be implemented using other types of filter such as, for example, infinite impulse response (IIR) filters.

Modulator 120 may be operated in three modes: a GMSK mode, an 8PSK mode, and a transition mode. Modulator 120 generates the estimated GMSK signal $s_g(n)$ in the GMSK mode and the 8PSK signal $s_p(n)$ in the 8PSK mode. Modulator 120 temporarily operates in the transition mode when transitioning between the GMSK mode and 8PSK mode. Table 1 summarizes the configuration of modulator 120 for the three modes.

TABLE 1

|  | GMSK Mode | 8PSK Mode | Transition Mode |
| --- | --- | --- | --- |
| Input data format | binary | 8-ary | see below |
| $c_0$ filter 460 | ON | ON | ON |
| $c_1$ filter 470 | ON | OFF | gradually ON/OFF |
| C0_Sel | 1 | 0 | see below |
| C1_Sel | 0 | 1 | see below |

As indicated in Table 1, the $c_0$ filter is enabled for all three modes, while the $c_1$ filter is only enabled for the GMSK mode and the transition mode. In the GMSK mode, the $c_1$ filter is used to generate an accurate estimate of the ideal GMSK signal. In the transition mode, the $c_1$ filter serves as an interpolator between two waveforms for the two modulation schemes.

For the GMSK mode (with C0_Sel=1 and C1_Sel=0), the incoming bit stream from TX data processor 112 is considered as a binary (or 1-tuple) stream and undergoes the processing for $c_0(n)$ and $c_1(n)$, as described above for FIG. 4. For the 8PSK mode (with C0_Sel=0 and C1_Sel=1), the incoming bit stream from TX data processor 112 is considered as an 8-ary (or 3-tuple) stream and undergoes the processing for 8PSK, as described above for FIG. 5. For the 8PSK mode, the $c_1$ filter is provided with all zeros and is essentially disabled. For the transition mode, the $c_1$ filter is turned ON gradually during a transition from 8PSK to GMSK and turned OFF gradually during a transition from GMSK to 8PSK. Gradually turning ON/OFF the $c_1$ filter ensures a smooth transition between the GMSK and 8PSK waveforms in the modulator output signal $s_0(n)$, so that undesired spectral artifacts are not generated in the modulator output signal.

Figure 8:
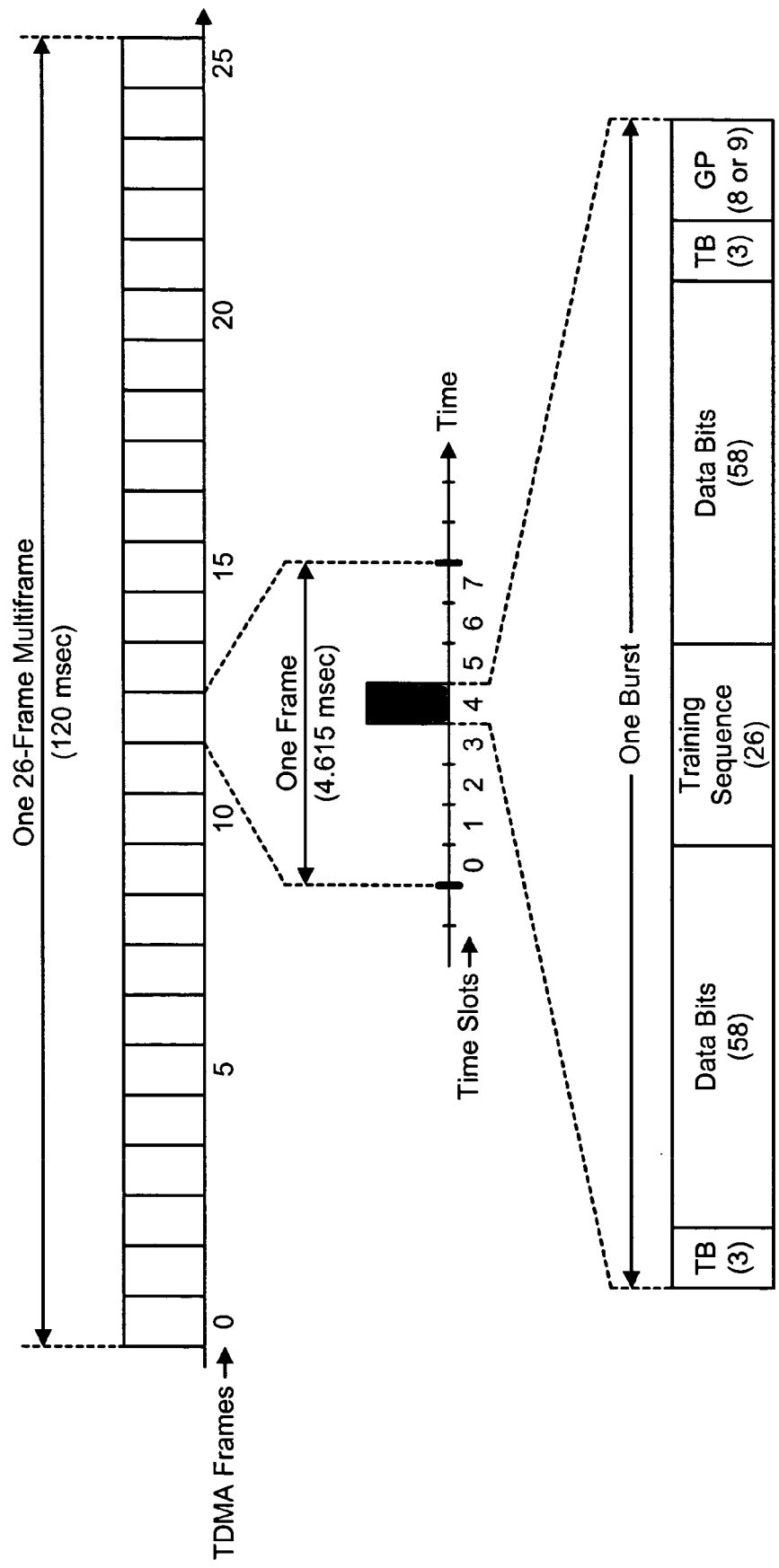
FIG. 8 shows a frame and time slot structure for GSM.

FIG. 8 shows a frame and time slot structure for GSM. The timeline for transmission is divided into multiframes. Each multiframe spans 120 msec and includes 26 TDMA (time division multiple access) frames, which are labeled as TDMA frames 0 through 25. Each TDMA frame is further partitioned into 8 time slots, which are labeled as time slots 0 through 7. A transmission in each time slot is referred to as a "burst" in GSM. Each burst includes two tail bit (TB) fields, two data fields, a training sequence field, and a guard period (GP). The number of binary bits/8-ary symbols for each field is shown inside parentheses. The frame and time slot structure for GSM is described in a document 3GPP TS 05.01, which is publicly available.

For a voice call, a wireless device/user is typically assigned one time slot index for the duration of the call. User-specific data for the user is sent in the time slot assigned to that user and in TDMA frames used for traffic data. For a packet data call, a user may be assigned one slot index (similar to a voice call) or multiple slot indices (which is called a multi-slot). One or more bursts may be transmitted for the multi-slot. A multi-slot configuration may also allow for transmission of bursts of different modulation schemes (GMSK and 8PSK) in adjacent time slots.

Modulator 120 may be switched between the GMSK mode and the 8PSK mode during the guard period (GP) at the end of a burst. The guard period may span 8 symbol periods for time slots 1, 2, 3, 5, 6, and 7 and may span 9 symbol periods for time slots 0 and 4. During a transition between GMSK and 8PSK, abruptly connecting or disconnecting the $c_1$ filter may introduce discontinuity in the modulator output signal $s_0(n)$, which may then cause undesired spectral effects. A smooth transition between GMSK and 8PSK, with continuity in both the amplitude and phase of the modulator output signal $s_0(n)$, may be achieved by (1) providing suitable data patterns to the $c_0$ and $c_1$ filters during the guard period, (2) using an appropriate initial phase value in the pre-processor for the new modulation scheme, and (3) gradually turning ON/OFF the $c_1$ filter, as described below.

Figure 9:
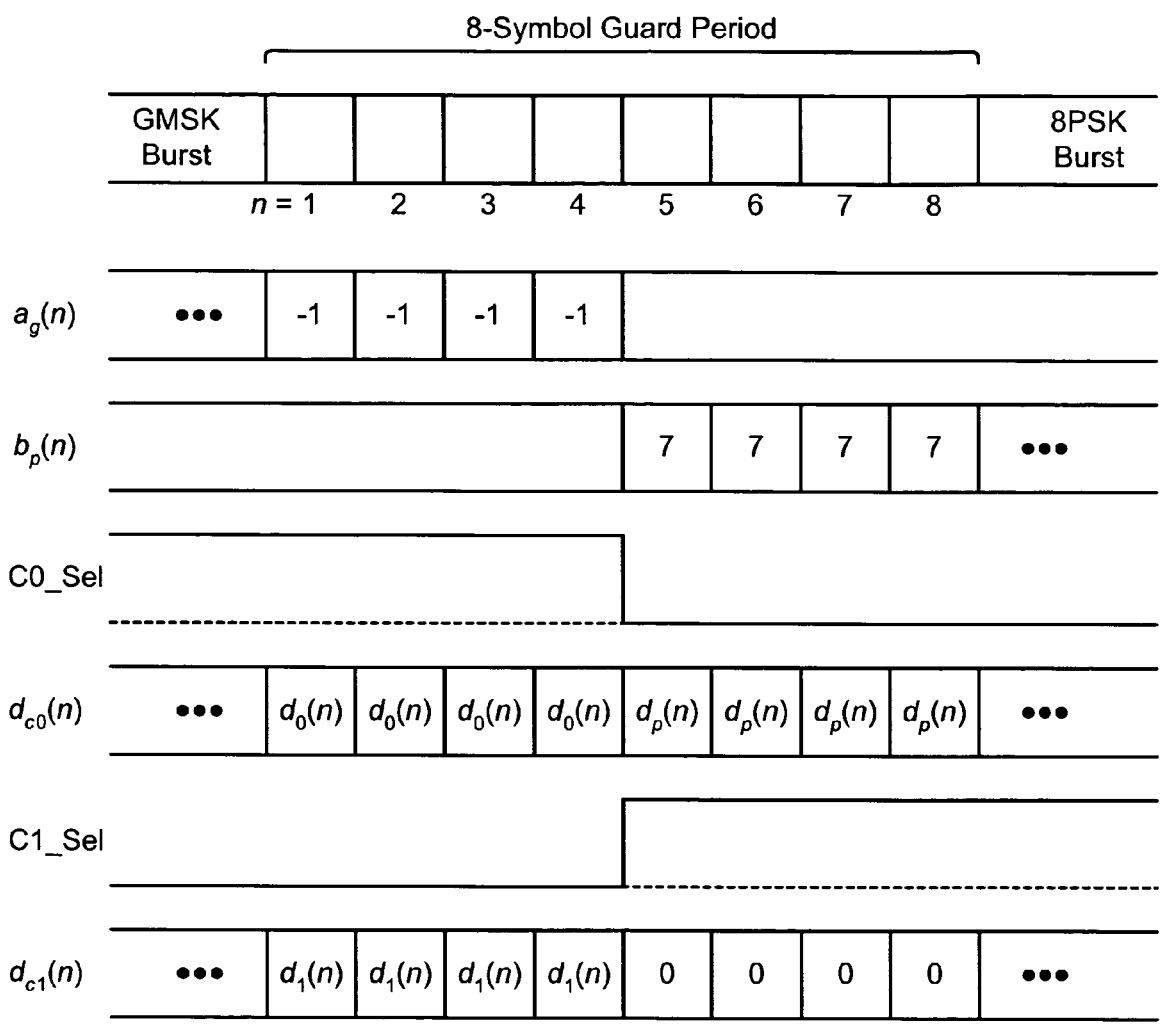
FIG. 9 shows symbols and controls for a transition from GMSK to 8PSK.

FIG. 9 shows the symbols and controls for a transition from GMSK to 8PSK for an 8-symbol guard period. In an embodiment, a data pattern containing four GMSK input bits $a_g(n)$ of −1 followed by four 8PSK Gray coded symbols $b_p(n)$ of 7 is used for the guard period, as shown in FIG. 9. The input bits $a_g(n)$ are processed by pre-processors 430 and 440 to generate GMSK symbols $d_0(n)$ and $d_1(n)$, respectively, as described above for FIG. 4. The Gray coded symbols $b_p(n)$ are processed by pre-processor 450 to generate 8PSK symbols $d_p(n)$, as described above for FIG. 5. The data pattern for the $c_0$ filter may be given as $a_{c0\_gp}(n)$ {−1, −1, −1, 7, 7, 7, 7}.

The C0_Sel control signal transitions from logic high to logic low at the start of symbol period 5 in the guard period (or simply, GP symbol period 5). The GMSK symbols $d_0(n)$ from pre-processor 430 are provided as the filter input symbols $d_{c0}(n)$ for the $c_0$ filter prior to GP symbol period 5 when the C0_Sel control signal is at logic high. The 8PSK symbols $d_p(n)$ from pre-processor 450 are provided as the filter input symbols $d_{c0}(n)$ starting at GP symbol period 5 when the C0_Sel control signal is at logic low.

The C1_Sel control signal transitions from logic low to logic high at the start of GP symbol period 5. The GMSK symbols $d_1(n)$ from pre-processor 440 are provided as the filter input symbols $d_{c1}(n)$ for the $c_1$ filter prior to GP symbol period 5 when the C1_Sel control signal is at logic low. Zeros are provided as the filter input symbols $d_{c1}(n)$ starting at GP symbol period 5 when the C1_Sel control signal is at logic high. These zeros are used to flush out the $c_1$ filter content.

For a 9-symbol guard period, a data pattern containing four GMSK input bits of −1 followed by five 8PSK Gray coded symbols of 7 may be used for the guard period, or $a_{c0\_gp}(n)$= {−, −1, −1, −1, 7, 7, 7, 7, 7}. The C0_Sel control signal transitions from logic high to logic low and the C1_Sel control signal transitions from logic low to logic high at the start of GP symbol period 5, which is the same as for the 8-symbol guard period.

Table 2 shows the contents of the $c_0$ and $c_1$ filters during the guard period for a GMSK-to-8PSK transition. The filter input symbols $d_{c0}(n)$ are provided to the 5-tap $c_0$ filter. For each symbol period, the $c_0$ filter operates on the current input symbol and four prior input symbols, as shown in FIG. 7. The filter input symbols $d_{c1}(n)$ are provided to the 3-tap $c_1$ filter. For each symbol period, the $c_1$ filter operates on the current input symbol and two prior input symbols, as also shown in FIG. 7. For simplicity, Table 2 shows the input bits $a_g(n)$ and the Gray coded symbols $b_p(n)$ used to generate the filter input symbols $d_{c0}(n)$ and $d_{c1}(n)$. A 't' in Table 2 indicates a known symbol for the second tail bit field of a preceding burst (t=1 if the preceding burst is GMSK and t=7 if the preceding burst is 8PSK). An 'x' in Table 2 indicates an unknown symbol stored in the filter from the preceding burst.

TABLE 2

| | GMSK-to-8PSK Transition | | | | | | | | | |
|---|---|---|---|---|---|---|---|---|---|---|
| | $c_0$ Filter Content | | | | | | $c_1$ Filter Content | | | |
| GP n | $d_{c0}(n)$ | $d_{c0}(n-1)$ | $d_{c0}(n-2)$ | $d_{c0}(n-3)$ | $d_{c0}(n-4)$ | C0_Sel | $d_{c1}(n)$ | $d_{c1}(n-1)$ | $d_{c1}(n-2)$ | C1_Sel |
| 1 | −1 | t | t | t | x | 1 | −1 | t | t | 0 |
| 2 | −1 | −1 | t | t | t | 1 | −1 | −1 | t | 0 |
| 3 | −1 | −1 | −1 | t | t | 1 | −1 | −1 | −1 | 0 |
| 4 | −1 | −1 | −1 | −1 | t | 1 | −1 | −1 | −1 | 0 |
| 5 | 7 | −1 | −1 | −1 | −1 | 0 | 0 | −1 | −1 | 1 |
| 6 | 7 | 7 | −1 | −1 | −1 | 0 | 0 | 0 | −1 | 1 |

TABLE 2-continued

GMSK-to-8PSK Transition

| | $c_0$ Filter Content | | | | | | $c_1$ Filter Content | | | |
|---|---|---|---|---|---|---|---|---|---|---|
| GP n | $d_{c0}(n)$ | $d_{c0}(n-1)$ | $d_{c0}(n-2)$ | $d_{c0}(n-3)$ | $d_{c0}(n-4)$ | C0_Sel | $d_{c1}(n)$ | $d_{c1}(n-1)$ | $d_{c1}(n-2)$ | C1_Sel |
| 7 | 7 | 7 | 7 | −1 | −1 | 0 | 0 | 0 | 0 | 1 |
| 8 | 7 | 7 | 7 | 7 | −1 | 0 | 0 | 0 | 0 | 1 |
| 9 | 7 | 7 | 7 | 7 | 7 | 0 | 0 | 0 | 0 | 1 |

Table 2 shows the contents of the $c_0$ and $c_1$ filters based on the timing at the filter inputs. The $c_0$ filter output is delayed by two symbol periods relative to the $c_0$ filter input (e.g., the first −1 enters the $c_0$ filter at n=4 and appears at the filter output at n=6). The $c_1$ filter output is delayed by one symbol period relative to the $c_1$ filter input (e.g., the first −1 enters the $c_1$ filter at n=4 and appears at the filter output at n=5).

As shown in Table 2, the first Gray coded symbol of 7 enters the $c_0$ filter and the first zero enters the $c_1$ filter at GP symbol period n=5. The $c_1$ filter is completely flushed out and filled with zeros at n=7 and may thus be turned OFF after that. The GMSK waveform essentially ends at GP symbol period n=4, which is the last symbol period in which the $c_0$ and $c_1$ filter contents are filled with only GMSK symbols. The 8PSK waveform starts at GP symbol period n=9, which is the first symbol period in which the $c_0$ filter is filled with only 8PSK symbols and the $c_1$ filter is filled with zeros. From GP symbol periods n=5 through n=8, the modulator output signal is neither pure GMSK nor pure 8PSK. The $c_0$ and $c_1$ filter outputs during these symbol periods may be considered as interpolating between GMSK and 8PSK, with the $c_1$ filter performing the interpolation based on the zero inputs.

The data patterns described above for the 8-symbol and 9-symbol guard periods are selected to have certain desirable characteristics. First, these data patterns reduce variation in the envelope of the 8PSK waveform. GSM defines a time mask (which is transmit power level versus time) for an 8PSK burst. This time mask requires the 8PSK symbols in the first tail bit field (or the first three "guard" symbols) prior to the useful part of an 8PSK burst to have an amplitude variation of 2.4 dB or less. Since 8PSK is a non-constant envelope modulation, using a random-like data pattern in the preceding guard period may cause a large envelope variation that may fail the time mask. The first three guard symbols of the 8PSK burst are derived from Gray coded symbols of 7, and the last few symbols in the data pattern are selected to be Gray coded symbols of 7 to match those used for the guard symbols. 8PSK symbols $d_p(n)$ generated from a stream of same Gray coded symbols have a tone of 50.7812 kHz, which results from an 8PSK symbol rate of 270.833 kHz and each 8PSK symbol being rotated at a rate of $3\pi/8$ radians per symbol period. The $c_0$ filter output thus resembles a tone of 50.7812 kHz. The envelope of this tone varies between 1.0 dB and 1.3 dB and thus meets the time mask requirement for GSM.

Second, the data patterns satisfy a GSM requirement for the internal state of the modulator at the end of a GMSK burst. Before the first bit of a GMSK burst enters the modulator and after the last bit of the GMSK burst, the modulator is required to have an internal state as if an input bit stream consisting of all −1s have been provided to the modulator. The first few input bits in the data patterns are thus selected to be −1s. GMSK symbols $d_0(n)$ generated from a stream of same input bits have a tone of 67.7 kHz, which results from a GMSK symbol rate of 270.833 kHz and each GMSK symbol being rotated at a rate of $\pi/2$ radians per symbol period.

Exemplary data patterns having certain desirable characteristics are described above. However, other data patterns may also be used for the guard period.

The initial phase $\theta_{init\_8\,psk}$ to use for the 8PSK symbols $d_p(n)$ is selected to provide a smooth phase transition from the GMSK waveform to the 8PSK waveform. For GP symbol periods n=1 through n=4, the input bits $a_g(n)$ are −1s, and the GMSK symbols $d_0(n)$ are rotated at a rate of $\pi/2$ radians per symbol period in a counter-clockwise direction. The last GMSK symbol $d_0(n)$ at GP symbol period n=4 may have a phase of 0°, 90°, 180° or 270°, depending on the number of bits preceding this bit in the current multi-slot. For GP symbol periods n=5 through n=8 (for an 8-symbol guard period) or n=9 (for a 9-symbol guard period), the Gray coded symbols $b_p(n)$ are 7s, and the 8PSK symbols $d_p(n)$ are rotated at a rate of $3\pi/8$ radians per symbol period in the same counter-clockwise direction.

FIG. 10 shows the phases of the GMSK symbols $d_0(n)$ and the 8PSK symbols $d_p(n)$. To ensure a smooth phase transition, the 8PSK symbols should follow the same trend of rotation as the GMSK symbols. For the example shown in FIG. 10, the last GMSK symbol at GP symbol period n=4 has a phase of 270°, or $3\pi/2$. To continue the trend of rotation, the first 8PSK symbol at GP symbol period n=5 should have a phase of $15\pi/8=3\pi/2+3\pi/8$. If the symbol index n is set to 0 for the first 8PSK symbol, then a phase of $15\pi/8$ may be obtained with $\theta_{init\_8\,psk}=5$, as shown in equation (10). A different value may be used for $\theta_{init\_8\,psk}$ if the symbol index n is set to some other value for the first 8PSK symbol.

Table 3 shows the initial phase of the first 8PSK symbol at GP symbol period n=5 for different ending phases for the last GMSK symbol at GP symbol period n=4. It should be noted that $\theta_{init\_8\,psk}$ is given in units/increments of $3\pi/8$ in Table 3. The initial phase $\theta_{init\_8\,psk}$ is used starting at GP symbol period n=5 and remains constant until the next GMSK-to-8PSK transmission.

TABLE 3

| Phase of last GMSK symbol at n = 4 | Phase of first 8PSK symbol at n = 5 | Initial phase $\theta_{init\_8psk}$ |
|---|---|---|
| 0 | $3\pi/8$ | 1 |
| $\pi/2$ | $7\pi/8$ | 13 |
| $\pi$ | $11\pi/8$ | 9 |
| $3\pi/2$ | $15\pi/8$ | 5 |

Figure 11:
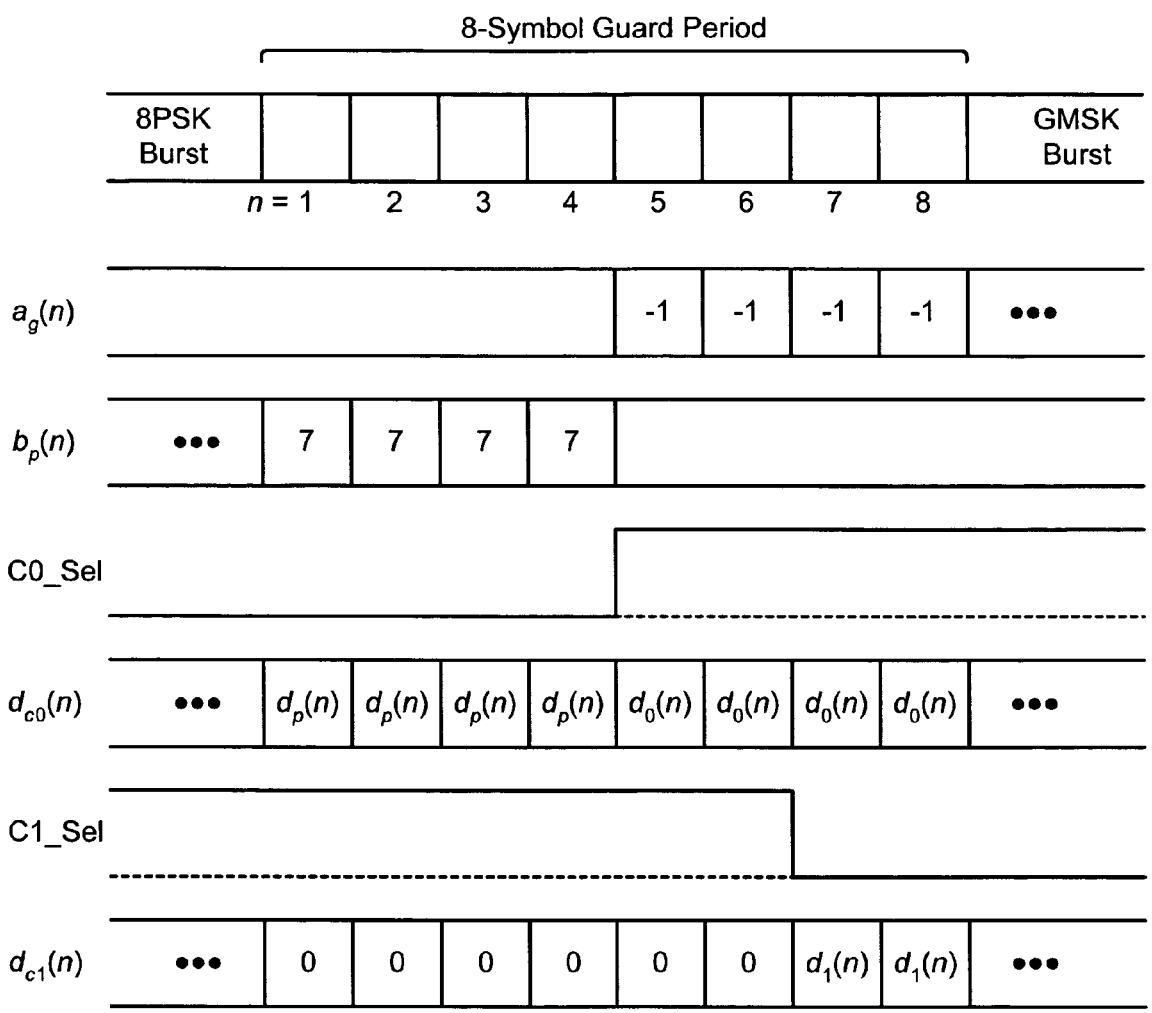
FIG. 11 shows symbols and controls for a transition from 8PSK to GMSK.

FIG. 11 shows the symbols and controls for a transition from 8PSK to GMSK for an 8-symbol guard period. In an embodiment, a data pattern containing four 8PSK Gray coded symbols $b_p(n)$ of 7 followed by four GMSK input bits $a_g(n)$ of −1 is used for the guard period, as shown in FIG. 11. This data pattern is selected based on reasons similar to those described above for the GMSK-to-8PSK transition. The data pattern may be given as $a_{c0\_pg}(n)=\{7, 7, 7, 7, -1, -1, -1, -1\}$. The C0_Sel control signal transitions from logic low to logic high at the start of GP symbol period 5. The 8PSK symbols $d_p(n)$ are provided as the filter input symbols $d_{c0}(n)$ for the $c_0$ filter prior to GP symbol period 5, and the GMSK symbols $d_0(n)$ are provided as the filter input symbols $d_{c0}(n)$ starting at GP symbol period 5. The C1_Sel control signal transitions from logic high to logic low at the start of GP symbol period 7, or two symbol periods later than the C0_Sel transition for the reason described below. Zeros are provided as the filter input symbols $d_{c1}(n)$ for the $c_1$ filter prior to GP symbol period 7, and the GMSK symbols $d_1(n)$ are provided as the filter input symbols $d_{c1}(n)$ starting at GP symbol period 7.

For a 9-symbol guard period, a data pattern containing five 8PSK Gray coded symbols of 7 followed by four GMSK input bits of −1 may be used for the guard period, or $a_{c0\_pg}(n) = \{7, 7, 7, 7, 7, -1, -1, -1, -1\}$. The C0_Sel control signal transitions from logic low to logic high at the start of GP symbol period 5, and the C1_Sel control signal transitions from logic high to logic low at the start of GP symbol period 7, which is the same as for the 8-symbol guard period. The data patterns for the 8-symbol and 9-symbol guard periods are selected to have the desirable characteristics described above. However, other data patterns may also be used.

Table 4 shows the contents of the $c_0$ and $c_1$ filters during the guard period for an 8PSK-to-GMSK transition. For simplicity, Table 4 shows the input bits $a_g(n)$ and Gray coded symbols $b_p(n)$ used to generate the filter input symbols $d_{c0}(n)$ and $d_{c1}(n)$.

symbol $d_p(n)$ at GP symbol period n=4 may have any one of 16 possible phases, or $v \cdot \pi/8$, where $v$ may be any integer value from 0 through 15. To ensure a smooth transition, the phase of the first pair of GMSK symbols $d_0(n)$ and $d_1(n)$ for GP symbol period n=5 may be determined by (1) adding $\pi/2$ to the phase of the last 8PSK symbol and (2) rounding the resultant phase to the closest multiple integer of $\pi/2$. The rounding is so that the phases of the GMSK symbols are integer multiples of $\pi/2$ (which simplifies the GMSK modulator design) and only a small disruption to the phase rotation occurs (if at all). Table 5 shows the initial phase of the first GMSK symbol at GP symbol period n=5 for different ending phases for the last 8PSK symbol at GP symbol period n=4. The initial phase $\theta_{init\_gmsk}$ is used starting at GP symbol period n=5 and remains constant until the next 8PSK-to-GMSK transmission.

TABLE 5

| Phase of last 8PSK symbol at n = 4 | Phase of first GMSK symbol at n = 5 | Initial phase $\theta_{init\_gmsk}$ |
|---|---|---|
| 0 | $\pi/2$ | 1 |
| $\pi/8$ | $\pi/2$ | 1 |
| $2\pi/8$ | $\pi/2$ | 1 |
| $3\pi/8$ | $\pi$ | 2 |

TABLE 4

8PSK-to-GMSK Transition

| | $c_0$ Filter Content | | | | | | $c_1$ Filter Content | | | |
|---|---|---|---|---|---|---|---|---|---|---|
| GP n | $d_{c0}(n)$ | $d_{c0}(n-1)$ | $d_{c0}(n-2)$ | $d_{c0}(n-3)$ | $d_{c0}(n-4)$ | C0_Sel | $d_{c1}(n)$ | $d_{c1}(n-1)$ | $d_{c1}(n-2)$ | C1_Sel |
| 1 | 7 | t | t | t | x | 0 | 0 | 0 | 0 | 1 |
| 2 | 7 | 7 | t | t | t | 0 | 0 | 0 | 0 | 1 |
| 3 | 7 | 7 | 7 | t | t | 0 | 0 | 0 | 0 | 1 |
| 4 | 7 | 7 | 7 | 7 | t | 0 | 0 | 0 | 0 | 1 |
| 5 | −1 | 7 | 7 | 7 | 7 | 1 | 0 | 0 | 0 | 1 |
| 6 | −1 | −1 | 7 | 7 | 7 | 1 | 0 | 0 | 0 | 1 |
| 7 | −1 | −1 | −1 | 7 | 7 | 1 | −1 | 0 | 0 | 0 |
| 8 | −1 | −1 | −1 | −1 | 7 | 1 | −1 | −1 | 0 | 0 |
| 9 | −1 | −1 | −1 | −1 | −1 | 1 | −1 | −1 | −1 | 0 |

As shown in Table 4, the first binary input bit of −1 enters the $c_0$ filter at GP symbol period n=5, and the first binary input bit of −1 enters the $c_1$ filter at GP symbol period n=7. The $c_1$ filter is enabled two symbol periods later than the $c_0$ filter because a transformed symbol $b_1(n)$ for the $c_1$ filter is obtained based on the current input bit and two prior input bits, as shown in equation (7). The $c_1$ filter is completely filled with −1 at n=9. The 8PSK waveform essentially ends at GP symbol period n=4, which is the last symbol period in which the $c_0$ filter is filled with only 8PSK symbols and the $c_1$ filter is filled with zeros. The GMSK waveform starts at GP symbol period n=9, which is the first symbol period in which the $c_0$ and $c_1$ filters are filled with only GMSK symbols. From GP symbol periods n=5 through n=8, the modulator output signal is neither pure 8PSK nor pure GMSK. The $c_0$ and $c_1$ filter outputs during these symbol periods may be considered as interpolating between 8PSK and GMSK, with the $c_1$ filter performing the interpolation with zero and −1 inputs.

The initial phase $\theta_{init\_gmsk}$ to use for the GMSK symbols $d_0(n)$ and $d_1(n)$ is selected to provide a smooth transition from the 8PSK waveform to the GMSK waveform. This may be achieved by ensuring that the GMSK symbols follow the same trend of rotation as the 8PSK symbols. The last 8PSK TABLE 5-continued

| Phase of last 8PSK symbol at n = 4 | Phase of first GMSK symbol at n = 5 | Initial phase $\theta_{init\_gmsk}$ |
|---|---|---|
| $4\pi/8$ | $\pi$ | 2 |
| $5\pi/8$ | $\pi$ | 2 |
| $6\pi/8$ | $\pi$ | 2 |
| $7\pi/8$ | $3\pi/2$ | 3 |
| $8\pi/8$ | $3\pi/2$ | 3 |
| $9\pi/8$ | $3\pi/2$ | 3 |
| $10\pi/8$ | $3\pi/2$ | 3 |
| $11\pi/8$ | 0 | 0 |
| $12\pi/8$ | 0 | 0 |
| $13\pi/8$ | 0 | 0 |
| $14\pi/8$ | 0 | 0 |
| $15\pi/8$ | $\pi/2$ | 1 |

The unified GMSK/8PSK modulator described herein can provide various advantages. First a single modulator may be used to support multiple modulation schemes/formats (e.g., GMSK and 8PSK). This may simplify the modulator design, the interface between the modulator and the TX data processor, and so on. The unified modulator allows for easy and smooth transition between GMSK and 8PSK, by using the $c_1$ filter to perform interpolation between the GMSK and 8PSK waveforms. This is especially desirable for a multi-slot configuration in which mixed modulation formats (both GMSK and 8PSK) are used for bursts sent in adjacent time slots. Furthermore, since the GMSK symbols $d_0(n)$ is a subset of the 8PSK symbols $d_p(n)$, the complexity of the $c_0$ filter is marginally increased (if at all) to support both GMSK and 8PSK.

For clarity, specific embodiments have been described above for a unified modulator for GMSK and 8PSK. Other embodiments of the unified modulator are also possible based on the description provided herein. In general, a unified modulator may be designed to support any number of modulation schemes, where each supported modulation scheme may be a CPM scheme, a PSK scheme, a quadrature amplitude modulation (QAM) scheme, or some other scheme. A unified modulator may also include any number of filters for any number of pulse shaping functions. The number of filters and their impulse responses are determined by the particular modulation schemes being supported and/or the pulse shaping required by the supported modulation schemes. For example, the $c_0$ filter may be used for the (rotated) 8PSK waveform (as described above) and/or for other PSK waveforms of other PSK schemes. As another example, the PSK waveform may be filtered with the $c_0$ filter (as described above), a combination of filters (e.g., the $c_0$ and $c_1$ filters), or some other filter(s).

The unified modulator described herein may be used for various wireless systems (e.g., a GSM system supporting EGPRS). The unified modulator may also be used at a base station for data transmission on the forward link (or downlink) as well as at a wireless device for data transmission on the reverse link (or uplink).

The unified modulator may be implemented by various means. For example, the unified modulator may be implemented in hardware, software, or a combination thereof. For a digital hardware implementation, the unified modulator (e.g., the processing units shown in FIGS. 4 through 7) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For an analog hardware implementation, the unified modulator (e.g., the filters) may be implemented with analog circuitry (e.g., amplifiers, resistors, capacitors, inductors, and so on).

For a software implementation, the unified modulator may be implemented with modules (e.g., procedures, functions, and so on) that perform the functions described herein. The software codes may be stored in a memory unit (e.g., memory unit 132 in FIG. 1) and executed by a processor (e.g., controller 130). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a first filter operative to receive first symbols for a first modulation scheme or second symbols for a second modulation scheme, filter the first or second symbols, and provide a first filter output;
a second filter operative to receive and filter third symbols for the first modulation scheme and provide a second filter output; and
a summer operative to receive and sum the first and second filter outputs and provide a modulator output;
wherein initial first and third symbols are derived based on an initial phase value selected to provide a smooth phase for the modulator output when transitioning from the second modulation scheme to the first modulation scheme by performing adding and rounding functions for selected second modulation scheme symbols.

2. The apparatus of claim 1, wherein the first modulation scheme is a continuous phase modulation (CPM) scheme and the second modulation scheme is a phase shift keying (PSK) scheme.

3. The apparatus of claim 2, wherein the CPM scheme is associated with a plurality of pulse shaping functions, wherein the first filter has an impulse response corresponding to a largest pulse shaping function among the plurality of pulse shaping functions, and wherein the second filter has an impulse response corresponding to a second largest pulse shaping function among the plurality of pulse shaping functions.

4. The apparatus of claim 1, wherein the first modulation scheme is a Gaussian minimum shift keying (GMSK) scheme and the second modulation scheme is an 8-ary phase shift keying (8PSK) scheme.

5. The apparatus of claim 1 and operable in a first mode for the first modulation scheme and in a second mode for the second modulation scheme.

6. The apparatus of claim 5 and further operable in a third mode during a transition between the first and second modulation schemes.

7. The apparatus of claim 1, wherein the first and second filters are operative to receive first and second sequences of symbols, respectively, during a transition from the first modulation scheme to the second modulation scheme, and
wherein the second filter is reset to a known state based on the second sequence of symbols.

8. The apparatus of claim 7, wherein the first and second sequences of symbols are selected to reduce variation in an envelope of the modulator output.

9. The apparatus of claim 1, wherein the first and second filters are operative to receive the first and second sequences of symbols, respectively, during a transition from the second modulation scheme to the first modulation scheme, and wherein the second filter starts from a known state based on the second sequence of symbols.

10. The apparatus of claim 1, wherein the first symbols are derived based on an initial phase value selected from a transition lookup table to provide a smooth phase for the modulator output when transitioning from the second modulation scheme to the first modulation scheme.

11. The apparatus of claim 1, further comprising:
a first pre-processor operative to receive first input bits and generate the first symbols for the first filter;
a second pre-processor operative to receive second input bits and generate the second symbols for the first filter; and
a third pre-processor operative to receive the first input bits and generate the third symbols for the second filter.

12. The apparatus of claim 11, wherein the first modulation scheme is a continuous phase modulation (CPM) scheme that is associated with a plurality of pulse shaping functions, wherein the first pre-processor is operative to process the first input bits for a largest pulse shaping function among the plurality of pulse shaping functions to generate the first symbols, and wherein the third pre-processor is operative to process the first input bits for a second largest pulse shaping function among the plurality of pulse shaping functions to generate the third symbols.

13. The apparatus of claim 11, wherein the second modulation scheme is a phase shift keying (PSK) scheme, and wherein the second pre-processor is operative to process the second input bits for the PSK scheme to generate the second symbols.

14. The apparatus of claim 1, wherein the first and second filters are finite impulse response (FIR) filters.

15. The apparatus of claim 1, wherein the first and second filters are oversampled by an oversampling ratio (OSR) of L, where L is an integer greater than one.

16. The apparatus of claim 1 and operable in a wireless communication system.

17. The apparatus of claim 16, wherein the wireless communication system is a Global System for Mobile Communications (GSM) system supporting Enhanced General Packet Radio Service (EGPRS).

18. The apparatus of claim 1, wherein the first and second filters comprise a plurality of multipliers implemented with look-up tables.

19. An apparatus comprising:
a plurality of filters for a plurality of pulse shaping functions, each filter having an impulse response corresponding to one of the plurality of pulse shaping functions, wherein the plurality of filters are used to generate a plurality of waveforms for a plurality of modulation schemes, and wherein a waveform for each modulation scheme is generated with a different set of one or more filters selected from among the plurality of filters;
a summer operative to sum outputs of enabled ones of the plurality of filters to generate a modulator output; and
a plurality of pre-processors, each pre-processor operative to receive input bits for one of the plurality of modulation schemes and provide symbols for one of the plurality of filters,
wherein the plurality of filters comprises a first filter operative to receive first symbols for a first modulation scheme or second symbols for a second modulation scheme and a second filter operative to receive and filter third symbols for the first modulation scheme and provide a second filter output, and wherein initial first and third symbols are derived based on an initial phase value selected to provide a smooth phase for the modulator output when transitioning from the second modulation scheme to the first modulation scheme by performing adding and rounding functions for selected second modulation scheme symbols.

20. The apparatus of claim 19, further comprising:
a controller operative to select a modulation scheme from among the plurality of modulation schemes and to enable the set of one or more filters for the selected modulation scheme.

21. The apparatus of claim 19, wherein the first symbols are derived based on an initial phase value selected from a transition lookup table to provide a smooth phase for the modulator output when transitioning from the second modulation scheme to the first modulation scheme.

22. A method of generating a modulated signal, comprising:
filtering with a first filter first symbols for a first modulation scheme or second symbols for a second modulation scheme to generate a first filter output;
filtering with a second filter third symbols for the first modulation scheme to generate a second filter output; and
summing the first and second filter outputs to generate a modulator output, and wherein the modulator output is used to generate the modulated signal;
wherein initial first and third symbols are derived based on an initial phase value selected to provide a smooth phase for the modulator output when transitioning from the second modulation scheme to the first modulation scheme by performing adding and rounding functions for selected second modulation scheme symbols.

23. The method of claim 22, wherein the first modulation scheme is a continuous phase modulation (CPM) scheme and the second modulation scheme is a phase shift keying (PSK) scheme.

24. The method of claim 23, wherein the CPM scheme is associated with a plurality of pulse shaping functions, the method further comprising:
processing first input bits for a largest pulse shaping function among the plurality of pulse shaping functions to generate the first symbols; and
processing the first input bits for a second largest pulse shaping function among the plurality of pulse shaping functions to generate the third symbols.

25. The method of claim 23, further comprising:
processing second input bits for the PSK scheme to generate the second symbols.

26. The method of claim 22, wherein first and second sequences of symbols are filtered and summed during a transition between the first and second modulation schemes.

27. The method of claim 22, wherein the first symbols are derived based on an initial phase value selected from a transition lookup table to provide a smooth phase for the modulator output when transitioning from the second modulation scheme to the first modulation scheme.

28. An apparatus comprising:
means for filtering with a first filter first symbols for a first modulation scheme or second symbols for a second modulation scheme to generate a first filter output;
means for filtering with a second filter third symbols for the first modulation scheme to generate a second filter output; and
means for summing the first and second filter outputs to generate a modulator output, wherein the modulator output is used to generate the modulated signal,
wherein initial first and third symbols are derived based on an initial phase value selected to provide a smooth phase for the modulator output when transitioning from the second modulation scheme to the first modulation scheme by performing adding and rounding functions for selected second modulation scheme symbols.

29. The apparatus of claim 28, wherein the first modulation scheme is a continuous phase modulation (CPM) scheme and the second modulation scheme is a phase shift keying (PSK) scheme.

30. The apparatus of claim 29, wherein the CPM scheme is associated with a plurality of pulse shaping functions, the apparatus further comprising:
means for processing first input bits for a largest pulse shaping function among the plurality of pulse shaping functions to generate the first symbols; and means for processing the first input bits for a second largest pulse shaping function among the plurality of pulse shaping functions to generate the third symbols.

31. The apparatus of claim 29, further comprising:
means for processing second input bits for the PSK scheme to generate the second symbols.

32. The apparatus of claim 28, wherein first and second sequences of symbols are filtered and summed during a transition between the first and second modulation schemes.

33. The apparatus of claim 28, wherein the first symbols are derived based on an initial phase value selected from a transition lookup table to provide a smooth phase for the modulator output when transitioning from the second modulation scheme to the first modulation scheme.

34. A non-transitory computer-readable medium having a computer program, which when executed by at least one processor, operates to generate a modulated signal, the computer program comprising:
instructions for filtering with a first filter first symbols for a first modulation scheme or second symbols for a second modulation scheme to generate a first filter output;
instructions for filtering with a second filter third symbols for the first modulation scheme to generate a second filter output; and
instructions for summing the first and second filter outputs to generate a modulator output, and wherein the modulator output is used to generate the modulated signal;
wherein initial first and third symbols are derived based on an initial phase value selected from a transition lookup table to provide a smooth phase for the modulator output when transitioning from the second modulation scheme to the first modulation scheme by performing adding and rounding functions for selected second modulation scheme symbols.

35. At least one processor configured to perform a method of generating a modulated signal, the method comprising:
filtering with a first filter first symbols for a first modulation scheme or second symbols for a second modulation scheme to generate a first filter output;
filtering with a second filter third symbols for the first modulation scheme to generate a second filter output; and
summing the first and second filter outputs to generate a modulator output, and wherein the modulator output is used to generate the modulated signal;
wherein initial first and third symbols are derived based on an initial phase value selected to provide a smooth phase for the modulator output when transitioning from the second modulation scheme to the first modulation scheme by performing adding and rounding functions for selected second modulation scheme symbols.

* * * * *